US007203858B2

(12) United States Patent
Loukianov et al.

(10) Patent No.: US 7,203,858 B2
(45) Date of Patent: Apr. 10, 2007

(54) PROGRAM CLOCK SYNCHRONIZATION IN MULTIMEDIA NETWORKS

(75) Inventors: Dmitrii Loukianov, Chandler, AZ (US); Adrian P. Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 10/741,675

(22) Filed: Dec. 19, 2003

(65) Prior Publication Data

US 2005/0138455 A1    Jun. 23, 2005

(51) Int. Cl.
*G06F 1/12* (2006.01)
(52) U.S. Cl. .................. 713/400; 713/600; 370/516; 725/151; 386/95
(58) Field of Classification Search ............. 713/400, 713/600; 370/516; 725/151; 386/95
See application file for complete search history.

(56) References Cited

U.S. PATENT DOCUMENTS

| 5,835,668 A * | 11/1998 | Yanagihara .................. 386/95 |
| 5,966,387 A * | 10/1999 | Cloutier ...................... 370/516 |
| 6,072,369 A | 6/2000 | Dhong et al. |
| 6,347,119 B2 * | 2/2002 | Matsumura et al. ... 375/240.28 |
| 6,493,832 B1 * | 12/2002 | Itakura et al. .............. 713/600 |
| 2002/0141451 A1 | 10/2002 | Gates et al. |
| 2003/0018983 A1 * | 1/2003 | Kawabata et al. .......... 725/151 |

OTHER PUBLICATIONS

Digital Audio-Visual Council (DAVIC), "DAVIC 1.5 Specification: Jitter Concealment Tools", Technical Tool Specification, Revision 1.0, Jan. 22, 1999, Geneva, Switzerland.

Liu, Humphrey, "Submission of RTP Payload for MPEG2 MPTS", submission to the Competence Centre for Video Conference Services, TU Dresden, Germany, located at http://vcc.urz.tu-dresden.de/listarch/rem-conf-de-9910/msg00107.html, Oct. 22, 1999.

Liu, Humphrey et al., "Status Report on MP2T Extension to RTP", presentation of Cisco Systems, Inc., located at http://www-mice.cs.ucl.ac.uk/multimedia/misc/avt/IETF47/slides/Liu.ppt, 1999.

Tryfonas, Christos et al., "Timestamping Schemes for MPEG-2 Systems Layer and Their Effect on Receiver Clock Recovery", IEEE Transactions on Multimedia, pp. 251-263, Sep. 1999.

Tryfonas, Christos et al., "Effect of Input Traffic Correlation on Clock Recovery in MPEG-2 Systems Layer", Technical Report UCSC-CRL-99-6, University of California at Santa Cruz, Dept. of Computer Engineering, Mar. 1999.

Chang, Yu-Jen et al., *Design and Implementation of a Real-Time MPEG-II Bit Rate Measure System*, IEEE Transactions on Consumer Electronics, vol. 45, No. 1, pp. 165-170, Feb. 1999.

European Patent Office, International Search Report and Written Opinion for International Application No. PCT/US2004/041107, 13 pages, Mar. 14, 2005.

* cited by examiner

*Primary Examiner*—Thomas Lee
*Assistant Examiner*—Sean Weinman
(74) *Attorney, Agent, or Firm*—Alan Pedersen-Giles

(57) ABSTRACT

A method may include sampling a receive frequency at which information received over a communication link is played. The method may also include sampling a system frequency related to the communication link and computing a first value based on the sampled receive frequency and the sampled system frequency. A second value may be received via the communication link. The receive frequency may be adjusted based on the first value and the second value.

26 Claims, 3 Drawing Sheets

PROGRAM CLOCK SYNCHRONIZATION IN MULTIMEDIA NETWORKS

BACKGROUND

The claimed invention relates to transferring media information and, more particularly, to the distribution of media information across a network.

Various schemes have been proposed for distributing media information (e.g., video data, audio data, video conferencing data, etc.) along communication links. Wireless digital data broadcasting has been proposed for distributing media information among devices in, for example, home entertainment systems. One challenge in playing live streams of media information may be program clock synchronization. For example, a transmitter of the media information may be generating samples at a certain frequency (e.g., typically 48 kHz), which is synchronized to a master program clock (e.g., at 27 MHz Motion Picture Expert Group MPEG-2 System Time Clock). A receiver of the media information should play an identical number of samples per second to avoid buffer overflow or underflows, so it should generate a sample clock with the same frequency as that of the transmitter.

One scheme for such clock synchronization may be for a receiver to use timestamps generated by the transmitter to measure and adjust the difference between its sampling clock frequency and that of the transmitter. This scheme assumes that the communication link between the transmitter and receiver of the media information has a fixed and constant delay for every timestamp.

In carrier sense multiple access collision avoidance (CSMA/CA) networks or carrier sense multiple access collision detection (CSMA/CD) networks, however, the transport delay for packets delivering timestamps may not be constant. In the IEEE 802.11a/b/g-based wireless networks, for example, the transport delay from transmitter to receiver may vary from less than 1 ms to 30 ms or more. The variations in transport delay may be caused by interference from other devices, collisions, retransmissions, changes in signal strength, changes in data rate, and/or other factors. Such variations in transport delay may reduce the effectiveness of timestamp-based clock synchronization schemes.

BRIEF DESCRIPTION OF THE DRAWINGS

The accompanying drawings, which are incorporated in and constitute a part of this specification, illustrate one or more implementations consistent with the principles of the invention and, together with the description, explain such implementations. In the drawings.

DETAILED DESCRIPTION

The following detailed description refers to the accompanying drawings. The same reference numbers may be used in different drawings to identify the same or similar elements. Also, the following detailed description illustrates certain implementations and principles, but the scope of the claimed invention is defined by the appended claims and equivalents.

Figure 1:
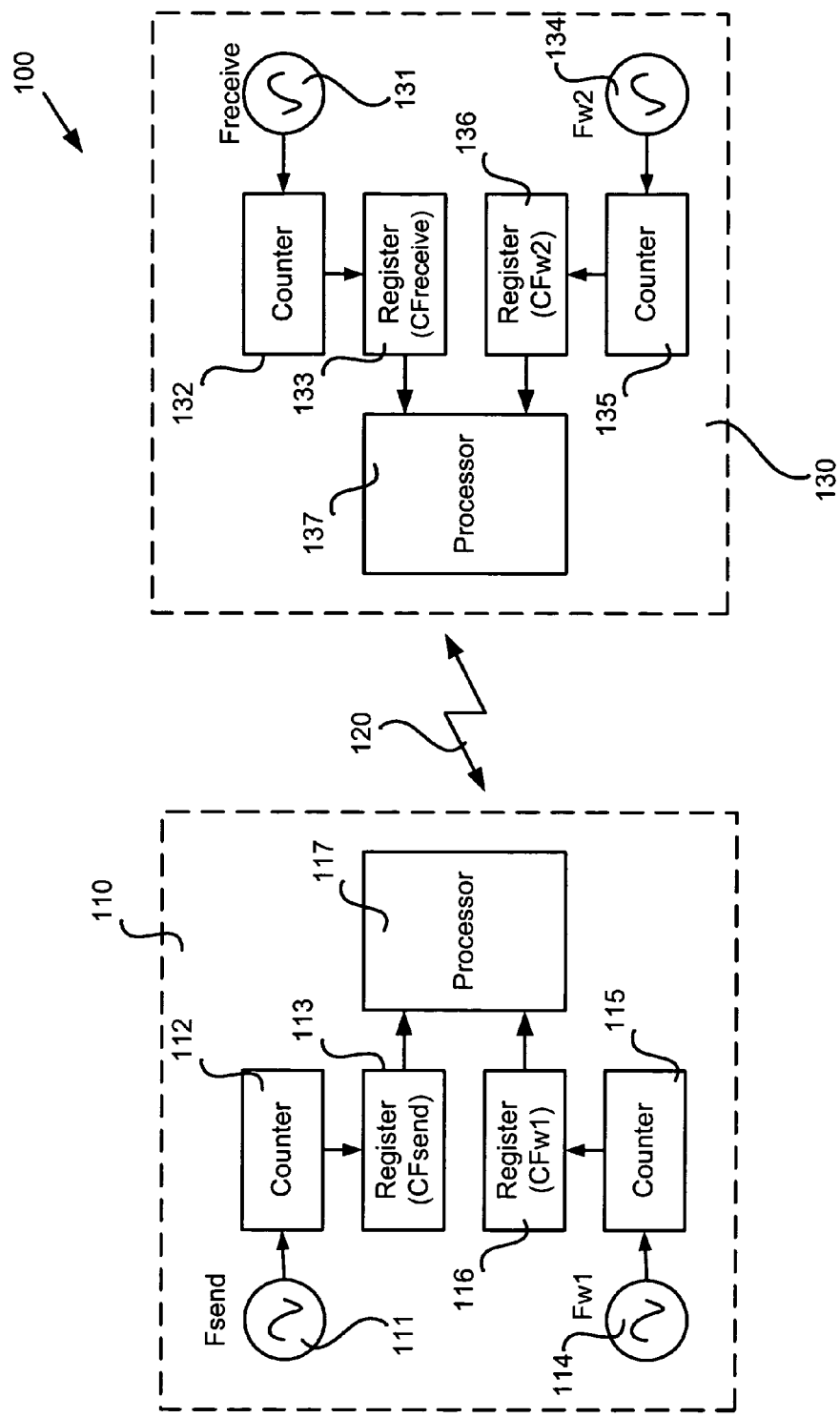
FIG. 1 illustrates an example system consistent with the principles of the invention.

FIG. 1 illustrates an example system 100 consistent with the principles of the invention. System 100 may include a transmitter 110 and a receiver 130 functionally connected by a communication link 120. In some implementations, and for the purposes of explanation, communication link 120 may be a wireless communication link, for example using one of the IEEE 802.11a/b/g protocols. In other implementations consistent with the principles of the invention, however, communication link 120 may be of a type used in other types of packet networks that use common clock between the source and destination (e.g., synchronous optical network (SONET), synchronous digital hierarchy (SDH), Ethernet in the same physical (PHY) domain, etc), and that has a mechanism to read the value of system time.

Transmitter 110 may include a program clock 111, a first counter 112, a first register 113, a network system clock 114, a second counter 115, a second register 116, and a processor 117. Although transmitter 110 may include some or all of elements 111–117, it may also include other elements (e.g., an interface for communication link 120) that are not illustrated for clarity of explanation. Further, elements 111–117 may be implemented by hardware, software/firmware, or some combination thereof, and although illustrated as separate functional modules for ease of explanation, elements 111–117 may not be implemented as discrete elements within transmitter 110.

Program clock 111 may generate a sending frequency Fsend (e.g., 48 kHz) at which samples of the media information are transmitted. Program clock 111 may include, for example, a voltage-controlled oscillator (VCO) to generate the sending frequency Fsend. First counter 112 may counter periods (or fractions thereof) in the sending frequency Fsend of program clock 111. In some implementations, first counter 112 may include a 32-bit digital counter, although a higher or lower number of counter bits may be used.

First register 113 may be arranged to store a value, CFsend, of first counter 112. In some implementations, first register 113 may periodically store the value of first counter 112. Processor 117, for example, may instruct first register 113 to perform a store operation at certain times.

Network system clock 114 may generate an accurate system frequency Fw1 (e.g., 1 MHz) to which various nodes in system 100 are synchronized. In IEEE 802.11a/b/g networks, for example, a common network system clock at system frequency Fw1 may already exist as required by the protocol within the same access point domain in independent basic service set (IBSS) mode, or among all nodes in basic synchronized subset (BSS) mode. Network system clock 114 may be needed for coordination of bursts from different nodes in CSMA/CA protocol. System clock 114 may include, for example, a crystal-controlled oscillator (XCO) to generate the system frequency Fw1.

Second counter 115 may counter periods (or fractions thereof) in the wireless network system frequency Fw of system clock 114. In some implementations, second counter 115 may include a 64-bit digital counter, although a higher or lower number of counter bits may be used. Second register 116 may be arranged to store a value, CFw1, of second counter 115. In some implementations, second register 116 may periodically store the value of second counter 115. Processor 117, for example, may instruct second register 116 to perform a store operation at certain time instances.

Processor 117, in addition to other tasks such as sending media information across communication link 120, may read the CFsend and CFw1 values from first and second registers 113 and 116. Processor 117 may also be arranged to perform computations based on the CFsend and CFw1 values and to transmit certain results over communication link 120, as will be described in greater detail below.

Receiver 130 may include a program clock 131, a first counter 132, a first register 133, a system clock 134, a second counter 135, a second register 136, and a processor 137. Many of elements 131–137 are similar in function and operation to elements 111–117 in transmitter 110, so for the purposes of brevity only certain differences in elements 131–137 of receiver will be highlighted.

Receiver 130's program clock 131 may generate a reference frequency Freceive (e.g., 48 kHz) at which received samples of the media information are played. Program clock 131 may include, for example, a voltage-controlled oscillator (VCO), Direct Digital frequency Synthesizer (DDS) or other adjustable oscillator to generate the receive frequency Freceive. Although not explicitly shown, both program clock 131 and system clock 134 may have associated adjustment circuitry so that processor 137 may adjust (e.g., by controlling a voltage input to a VCO) the reference frequency Freceive and the system frequency Fw2 as appropriate.

Typical operation of a wireless network including system 100 will now be described. In some networks, nodes (of which transmitter 110 and receiver 130 are examples) may periodically send beacons. The interval between beacons may be set to a value (e.g., 100 ms) that provides good performance for most applications. In certain networks, the beacons may be sent by a designated node (e.g., an access point), and in other networks, nodes may share responsibility for sending beacons.

The beacons may carry the timestamps of an IEEE 802.11a/b/g system clock running at 1 MHz as defined by the standard. The media access control (MAC) protocol ensures that the network system clocks (e.g., system clocks 114 and 134) in various nodes are synchronized in the network, with a maximum timing jitter of about 2–3 microseconds. Network interfaces in transmitter 110 and receiver 130 may provide a tool to read a value from a 64-bit local counter (e.g., from registers 116 and 136). The MAC protocol therefore results in accurate synchronization of a network clock within the MAC implementation.

Hence, in IEEE 802.11 networks, the system frequencies Fw1 and Fw2 may be synchronized fairly closely between transmitter 110 and receiver 130 by the mechanisms provided in IEEE802.11 MAC protocol. Such synchronization sometimes may be referred to as IEEE 802.11 time synchronization function (TSF) synchronization. As previously stated, however, to facilitate playback of media information at receiver 130, it is desirable to synchronize program clock 131 (e.g., Freceive) with program clock 111 (e.g., Fsend) in the presence of severe and unknown transport delays/jitter possible in IEEE 802.11 networks.

Figure 2:
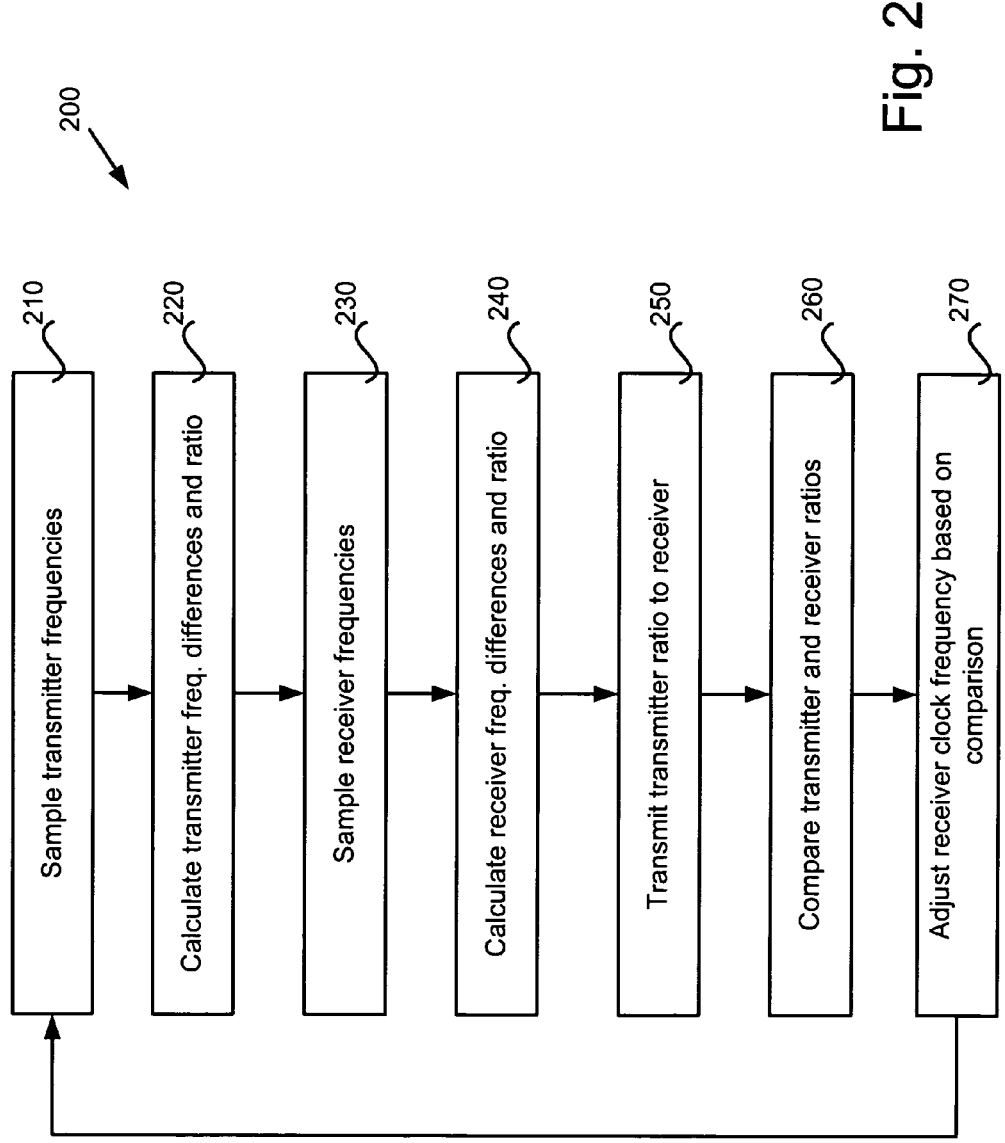
FIG. 2 is a flow chart illustrating a process of adjusting a program clock in the receiver of FIG. 1 consistent with the principles of the invention.

FIG. 2 is a flow chart illustrating a process 200 of adjusting program clock 131 consistent with the principles of the invention. Processing may begin with processor 117 periodically sampling Fsend and Fw1 by reading CFsend and CFw counter values from registers 113 and 116 [act 210]. The sampling (also known as timestamping) period may be selected for a suitable combination of performance and agility, and in some implementations may be about 100 ms. In some implementations consistent with the principles of the invention, the sampling period of Fsend and Fw1 may coincide with the interval between successive beacons. Act 210 may include reading CFsend and CFw from registers 113 and 116 more than once.

Processing may continue with processor 117 calculating the difference between sequential samples of program clock on the transmitting side CFsend, Diff_CFsend [act 220]. Processor 117 may also calculate the difference between sequential samples of network system clock CFw1, Diff_CFw1. Also in act 220, processor 117 may calculate a frequency proportionality coefficient K1=Diff_CFsend/Diff_CFw1. Proportionality coefficient K1 may express the ratio of the sender's program clock frequency Fsend in units of the network system frequency Fw1.

Periodically and possibly asynchronously from sampling in act 210, processor 137 may sample Freceive and Fw2 by reading CFreceive and CFw2 from registers 133 and 136 [act 230]. The sampling (also known as timestamping) period may be selected for a suitable combination of performance and agility, and in some implementations may be about 100 ms. In some implementations consistent with the principles of the invention, the sampling period of Freceive and Fw2 may coincide with the interval between successive beacons. Act 230 may include reading CFreceive and CFw2 from registers 133 and 136 more than once.

Processing may continue with processor 137 calculating the difference between sequential samples of locally maintained program clock on receive side CFreceive, Diff_CFreceive [act 240]. Processor 137 may also calculate the difference between sequential samples of network system clock CFw2, Diff_CFw2. Also in act 240, processor 137 may calculate a second (receive side) frequency proportionality coefficient K2=Diff_CFreceive/Diff_CFw2. Proportionality coefficient K2 may express the ratio of the receive frequency Freceive in units of the system frequency Fw2.

Processor 117 in transmitter 110 may transmit the frequency proportionality coefficient K1 to receiver 130 over communication link 120 [act 250]. Transmitter 110 may use any suitable protocol for transmitting K1. For example, if an internet protocol (IP) is used, transmission control protocol (TCP) or user datagram protocol (UDP) packets may be used to send K1. It should be noted that act 250 may occur before, or concurrently with, one or more of acts 230 and 240.

Processor 137 in receiver 130 may compare K1 and K2 and generate a difference signal DeltaK=K1−K2 [act 260]. When program clocks 111 and 131 are accurately synchronized, the difference signal DeltaK should be zero. The sign of the difference signal DeltaK may indicate the direction of frequency deviation of program clock 131 in receiver 130. For example, when program clock 131 is running slower than program clock 111, the difference signal DeltaK may be negative; otherwise it may be positive. The magnitude of the error depends on the frequency deviation and on the sampling interval.

Because the sampling intervals in acts 210 and 230 may not be the same, and in some implementations these intervals may not be not measured and thus are unknown, the difference signal DeltaK may not give exact frequency offset that could be used for instant adjustment of the program clock 131. The difference signal DeltaK, however, may be filtered by a low-pass filter and used in a control loop that adjusts the frequency Freceive of program clock 131 [act 270]. The control loop (not shown) should try to minimize the error and will eventually converge to DeltaK=0. This result implies that Freceive=Fsend, which is the desired goal.

Acts 210–270 may be executed repeatedly to assure continuous tracking of Fsend. Process 200 does not depend on the transport delay and is insensitive to retransmissions and data rate changes. All calculations listed in acts 210–270, as well as control loop filtering, may be implemented in software and/or microcode and/or dedicated hardware.

Several variations on system 100 and method 200 are possible, some of which will be further described. In one implementation, system 100 may be implemented in the network adapter, for example, in wireless network adapter MAC. Existing wireless MACs, however, do not have everything needed to implement the system 100. The clock signal of the system frequency Fw (e.g., 1 MHz) may not be available outside of the adapter and thus cannot be used to build complete system 100 outside the MAC as a self-contained unit. Therefore, an alternative scheme may be used where only a part of system 100 is implemented in the MAC, while the rest is located elsewhere in the multimedia system. For example, elements 111–113 and 131–133 of the system 100 may be implemented in the transport demultiplexer unit or video decoder.

In such implementation, counters 115 and 135 may be implemented in wireless MAC, and may be accessed by reading values CFw1 and CFw2 on a system bus (e.g., a Peripheral Component Interconnect (PCI) bus) used to attach a wireless network adapter to the rest of transmitter 110 and receiver 130. By contrast, CFsend and CFreceive may be implemented in another block attached to the same system bus. Thus, it may be difficult to ensure that sample CFsend and CFw1 are taken in the same time instance. The additional logic around the counters 111–113 and 131–137 may be designed to monitor when processors sample the CFw and generate a snapshot of program clock counters at the same time instance, and thus allow one to physically split program and network clock counters into separate blocks in the design.

Figure 3:
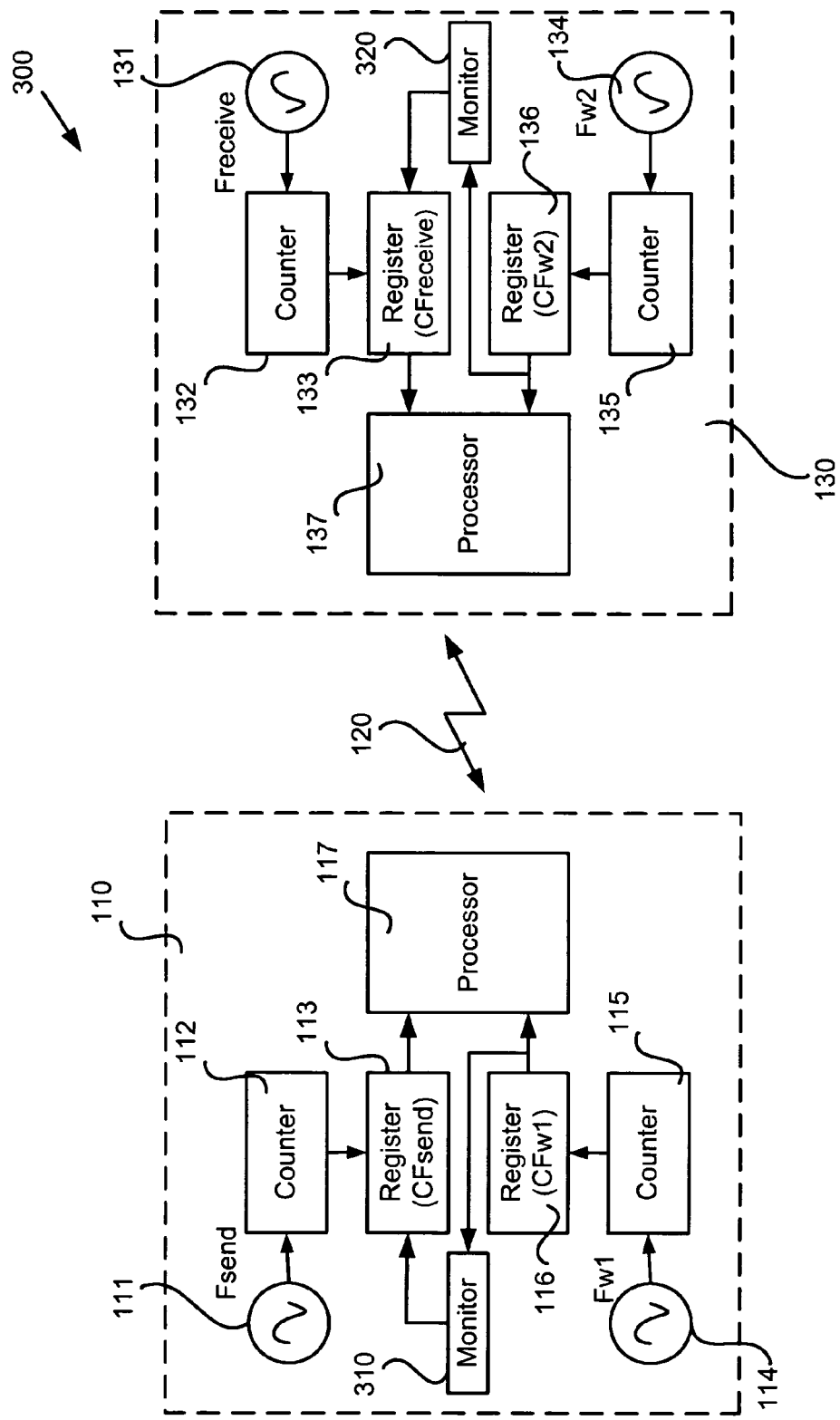
FIG. 3. illustrates another example system consistent with the principles of the invention

FIG. 3 illustrates an example system 300 consistent with the principles of the invention. System 300 may include the same elements of system 100, as well as bus monitor 310 in transmitter 110 and bus monitor 320 in receiver 130.

Monitor logic 310/320 may monitor system bus activity and may detect the moment when processor 117/137 performs a read access of CFw1 or CFw2. Monitor logic 310/320 may generate a trigger signal for register 113/133 to sample CFsend or CFreceive at such an instant. By using monitor logic 310/320, transmitter 110 and receiver 130 may sample CFsend and CFreceive immediately when their respective CFw1 and CFw2 is sampled. Although shown as a separate functional block, monitor logic 310/320 may be implemented via processor 117/137.

In another implementation, the sampling interval is made equal in both transmitter 110 and receiver 130. This equal sampling interval may be accomplished by sampling counters when a beacon signal is received or transmitted, because beacon signals do not experience transport delay. In such a case, the difference signal DeltaK will depend only on clock frequency difference, and thus may be used for instant correction of program clock 131's frequency Freceive. This variation allows one to decrease the time constant of the control loop filters (e.g., by removing a low-pass filter) and makes system 100/300 more responsive to program clock deviations.

If in addition to the frequency, the phase of the timebase in transmitter and receiver also should be synchronized, additional schemes to synchronize phase may be used. For example, multicast messages may be used to synchronize the phase of clock counters 112 and 132, and thus keep both frequency and the phase Fsend and Freceive accurate on both ends of system 100. Such multicast messages may be sent periodically, and used by receivers 130 if a substantial deviation of the phase is discovered that cannot be compensated by the adjustment of receive frequency Freceive. Such substantial deviations may be caused by catastrophic events in system 100, such as strong interference with communication link 120 for a long period. Multicast messages may also be sent by transmitter 110 when a discontinuity occurs in program clock 111, for instance when a commercial advertisement or other material which uses a different program clock is inserted in the media stream. Such splices may cause clock frequency and phase discontinuities. In such a case, the change in program clock 131's frequency may be relatively minor, but the phase of timebase should be reset to provide a correct reference for time stamps found in the media information.

The foregoing description of one or more implementations consistent with the principles of the invention provides illustration and description, but is not intended to be exhaustive or to limit the claimed invention to the precise form disclosed. Modifications and variations are possible in light of the above teachings or may be acquired from practice of the invention.

For example, the scheme described herein may be used in other applications that require accurate clock synchronization between the networked devices, for example in synthesized aperture audio systems, for determining location of computing devices, etc. The scheme may also be used for SONET and SDH, where the system frequency Fw, for example, may be derived from a bit clock. Fw may then used as a "porting" clock for synchronizing program clocks or other application-specific clocks within appropriate portions of the system.

Further, although a specific calculation is described with regard to FIG. 2, transmitter 110 in some implementations may send an indication of how (i.e., which direction) Fsend has changed in a sampling period and the magnitude of the change. If transmitter 110 and receiver 130 sample clock counters over the same time as described above, these direction and magnitude values may be usable for direct adjustment of Freceive without a low-pass filter or other smoothing device. If maintaining the same sample interval is not implemented, the direction and magnitude values reported by the transmitter 110 may still enable a control loop in receiver 130 to adjust program clock 131 so that Freceive tracks Fsend.

Also, although some implementations consistent with the principles of the invention may adjust the reference frequency Freceive of program clock 131 in receiver 130, other implementations may adjust a "virtual clock" to achieve a matching playback rate in receiver 130. For example, receiver 130 may implement a clock rate conversion scheme, where the reference frequency Freceive of program clock 131 is fixed at, for example, 44.1 kHz. Program clock 111 in transmitter 110 may have a higher sending frequency Fsend (e.g., 48 kHz), and receiver 130 may interpolate among received samples to output data at the reference frequency Freceive of, for example, 44.1 kHz. Instead of adjusting the reference frequency Freceive of program clock 131, receiver 130 will use the information (e.g., K1 and K2) about the ratio between sender's and receiver's program clocks and adjust the "virtual clock" that determines how the received samples are interpolated. Since the ratio between reference frequency Freceive to Fsend is known, the playback time for a given amount of data sent by transmitter 110 and a corresponding interpolated sample block generated by interpolation from the received data at receiver 130 may be made equal. For example, if the sending frequency Fsend slows down, the virtual clock in receiver 130 may direct the interpolator (e.g., processor 137) to produce fewer samples per second at its output, which is the desired effect.

Moreover, the acts in FIG. 2 need not be implemented in the order shown; nor do all of the acts necessarily need to be performed. Also, those acts that are not dependent on other acts may be performed in parallel with the other acts. Further, the acts in this figure may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Where only one item is intended, the term "one" or similar language is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method, comprising:
    sampling a program clock frequency at which information is sent over a communication link;
    sampling a system frequency related to the communication link;
    computing a result based on the sampled program clock frequency and the sampled system frequency; and
    transmitting the result over the communication link.

2. The method of claim 1, wherein the sampling a sending frequency includes:
    sampling a value of a counter counting the program clock frequency at a beginning and an end of a sampling interval.

3. The method of claim 1, wherein the sampling of the system frequency includes:
    sampling a value of a counter counting the system frequency at a beginning and an end of a sampling interval.

4. The method of claim 1, wherein the computing includes:
    calculating a first difference value related to the program clock frequency, and
    calculating a second difference value related to the system frequency.

5. The method of claim 4, wherein the computing further includes:
    dividing the first difference value by the second difference value to obtain the result.

6. The method of claim 1, wherein the sampling of the program clock frequency is triggered by the sampling of the system frequency.

7. The method of claim 1, further comprising:
    synchronizing the system frequency with a system frequency of a remote device via the communication link using a control protocol.

8. A method, comprising:
    sampling a program clock frequency at which information received over a communication link is played;
    sampling a system frequency related to the communication link;
    computing a first value based on the sampled program clock frequency and the sampled system frequency;
    receiving a second value via the communication link; and
    adjusting the program clock frequency based on the first value and the second value.

9. The method of claim 8, wherein the computing includes:
    calculating a first difference value related to the program clock frequency, and
    calculating a second difference value related to the system frequency.

10. The method of claim 9, wherein the computing further includes:
    dividing the first difference value by the second difference value to obtain the first value.

11. The method of claim 8, further comprising:
    generating a difference value from the first value and the second value,
    wherein the adjusting adjusts the program clock frequency based on the difference value.

12. The method of claim 11, wherein the adjusting further includes:
    changing a control voltage to an oscillator based on the difference value, or
    changing a numerical value to adjust a frequency of a local program clock oscillator, or
    changing a frequency of a virtual clock if data re-sampling is used in lieu of program clock adjustment.

13. The method of claim 8, wherein the second value indicates a sending frequency at which the received information is transmitted.

14. The method of claim 13, wherein the adjusting further includes:
    increasing the program clock frequency if the first value and the second value indicate that the program clock frequency lags behind the sending frequency, and
    decreasing the program clock frequency if the first value and the second value indicate that the sending frequency lags behind the program clock frequency.

15. The method of claim 13, where the adjusting includes:
    re-sampling the information based on a difference between the first value and the second value.

16. A device, comprising:
    a program clock to generate samples of information at a program frequency,
    first circuitry to sample the program frequency of the program clock;
    a system clock to generate a system frequency;
    second circuitry to sample the system frequency of the system clock;
    a processor to computationally combine the sampled program frequency from the first circuitry and the sampled system frequency from the second circuitry.

17. The device of claim 16, wherein the first circuitry includes:
    a first counter to increment in accordance with the program frequency, and
    a first register to store a value from the first counter.

18. The device of claim 16, wherein the second circuitry includes:
    a second counter to increment in accordance with the system frequency, and
    a second register to store a value from the second counter.

19. The device of claim 16, wherein the processor is arranged to divide the sampled program frequency by the sampled system frequency to generate a ratio.

20. The device of claim 19, wherein the processor is further arranged to send the ratio over a communication link to a receiver.

21. The device of claim 19, wherein the processor is further arranged to compare the ratio with another ratio received via a communication link from a transmitter.

22. The device of claim 21, wherein the processor is further arranged to adjust the program clock based on the ratio and the another ratio.

23. The device of claim 16, further comprising:
monitoring circuitry to trigger the first circuitry to sample the program frequency when the second circuitry samples the system frequency.

24. The device of claim 16, further comprising:
third circuitry to synchronize the system frequency with another system frequency in another device via a communication link.

25. A receiver, comprising:
a first clock to generate a first frequency;
a reference clock to generate a reference frequency;
a processor to combine information about the first frequency and information about the reference frequency, to receive information about a second frequency via a communication link with an unknown and variable transport delay, and to control the first clock based on the information about the first frequency, the information about the reference frequency, and the information about the second frequency.

26. The receiver of claim 25, further comprising:
first circuitry connected to the first clock to generate the information about the first frequency; and
second circuitry connected to the reference clock to generate the information about the reference frequency.

* * * * *